(12) United States Patent
Konno et al.

(10) Patent No.: US 7,635,140 B2
(45) Date of Patent: Dec. 22, 2009

(54) FENDER STRUCTURE FOR MOTORCYCLE

(75) Inventors: Kenji Konno, Saitama (JP); Hiroaki Oshigamo, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/892,763

(22) Filed: Aug. 27, 2007

(65) Prior Publication Data

US 2008/0054585 A1  Mar. 6, 2008

(30) Foreign Application Priority Data

Aug. 30, 2006  (JP) .............................. 2006-233231

(51) Int. Cl.
*B62K 11/00* (2006.01)
*B62D 61/02* (2006.01)

(52) U.S. Cl. .................... 280/152.1; 180/219

(58) Field of Classification Search ............... 296/78.1, 296/198, 191, 193.05, 181.1, 181.2, 203.03; D12/110; 280/68.1, 152.1, 847; 180/219, 180/229, 225
See application file for complete search history.

(56) References Cited

U.S. PATENT DOCUMENTS

| | | | | |
|---|---|---|---|---|
| D437,262 S | * | 2/2001 | Robb et al. | D12/110 |
| D500,972 S | * | 1/2005 | Davis, Jr. | D12/194 |
| 2003/0079938 A1 | * | 5/2003 | Yamaguchi | 181/227 |
| 2003/0132048 A1 | * | 7/2003 | Hata | 180/219 |

FOREIGN PATENT DOCUMENTS

JP  2005-313671 A  11/2005

* cited by examiner

*Primary Examiner*—Glenn Dayoan
*Assistant Examiner*—Melissa A Black
(74) *Attorney, Agent, or Firm*—Birch, Stewart, Kolasch & Birch, LLP

(57) ABSTRACT

To provide a fender structure for a motorcycle for preventing muddy water or the like running off a rear fender from being splashed on a muffler. A fender structure for a motorcycle is provided with an engine and wheels suspended therefrom. A fender covers the upper portion of the wheel and extends downwardly on the right and left sides. A muffler is positioned below at least one of the right and left edge portions of the fender. The fender structure includes a folded-back portion extending towards the inner side of the muffler from the corresponding edge portion of the fender.

20 Claims, 11 Drawing Sheets

FENDER STRUCTURE FOR MOTORCYCLE

CROSS-REFERENCE TO RELATED APPLICATIONS

The present application claims priority under 35 USC 119 to Japanese Patent Application No. 2006-233231 filed on Aug. 30, 2006 the entire contents of which are hereby incorporated by reference.

BACKGROUND OF THE INVENTION

1. Field of the Invention

The present invention relates to a fender structure for a motorcycle, which receives muddy water or the like splashed by a wheel during operation of the motorcycle.

2. Description of Background Art

An off-road motorcycle designed to travel on a rough terrain is provided with a rear fender covering the upper portion of the rear wheel. The rear fender receives muddy water or the like splashed by the rear wheel during traveling so as to play a role in preventing muddy water or the like from being splashed further upwardly. In addition, the rear fender is formed into a shape in which the right and left side portions extend downwardly in the cross section dividing the vehicle body into the front and rear portions. Accordingly, splashed muddy water or the like is caused to run down on the inner side of the rear fender to the right and left edge portions of the rear fender, and then to run off to the lower side of the vehicle body from the right and left edge portions.

It can be seen, from the rear side of the motorcycle, that mufflers are disposed respectively below the right and left edge portions of the rear fender. See, for example, Japanese Patent Application Laid-open Publication No. 2005-313671.

Disposing the rear fender in the above-described manner sometimes causes muddy water or the like running off the rear fender to be splashed on the mufflers. As a result, the moisture of the muddy water or the like is vaporized, so that soil adheres on the mufflers. In particular, when muddy water or the like runs on a vicinity of an exhaust port, soil adheres on the vicinity of the exhaust port, and thereby reduces the area of the opening of the exhaust port.

SUMMARY AND OBJECTS OF THE INVENTION

The present invention has been made in consideration of the above-described circumstances. An object of an embodiment of the present invention is to provide a fender structure for a motorcycle, which prevents muddy water or the like running off a rear fender from being splashed on a muffler.

An embodiment of the present invention provides a fender structure for a motorcycle with an engine and wheels suspended therefrom. A fender covers the upper portion of the wheel and extends downwardly on the right and left sides with a muffler positioned below at least one of the right and left edge portions of the fender. The fender structure of an embodiment of the present invention includes a folded-back portion extending toward a region on the inner side of the muffler from the corresponding edge portion of the fender.

According to the configuration, muddy water or the like splashed on the inner side of the fender is guided by the folded-back portion, and thereby the muddy water or the like can be made difficult to be splashed on the exhaust port when running off the fender.

In this case, the folded-back portion may extend towards the region on the inner side of the muffler, inwardly of an exhaust port of the muffler.

According to an embodiment of the present invention, muddy water or the like splashed on the inner side of the fender is guided by the folded-back portion, and thereby the muddy water or the like can be prevented from being splashed on the exhaust port when running off the fender.

In addition, the folded-back portion may enter into the inner side of the fender along the outer shape of the muffler.

According to an embodiment of the present invention, it is possible to attach the folded-back portion in a manner that the folded-back portion and the muffler do not interfere with each other.

Moreover, the edge portion of the folded-back portion may be positioned closer to the center of the vehicle body than the innermost rim portion of the muffler.

According to an embodiment of the present invention, it is possible to cause muddy water or the like to run off while securely avoiding the muffler.

Furthermore, the folded-back portion may be inclined downwardly.

According to the configuration, the folded-back portion is provided with a guiding function of controlling the running of muddy water or the like. For this reason, it is possible to securely cause muddy water or the like to run downwardly along the folded-back portion, as well as to prevent dried soil or the like from being stuck on the edge portion of the fender.

An embodiment of the present invention provides a fender structure for a motorcycle provided with an engine and wheels suspended therefrom. A fender covers the upper portion of the wheel and extends downwardly on the right and left sides. A muffler is positioned below at least one of the right and left edge portions of the fender. Since the fender structure includes a folded-back portion extending towards a region on the inner side of the muffler from the corresponding edge portion of the fender, muddy water or the like splashed on the inner side of the fender is guided by the folded-back portion, and thereby the muddy water or the like can be prevented from being splashed on the exhaust port when running off the fender. As a result, the muffler can be prevented from being contaminated with muddy water or the like, while it is possible to prevent muddy water or the like running down on the muffler from running in a vicinity of the exhaust port.

Since the folded-back portion extends towards the region on the inner side of the muffler, inward of an exhaust port of the muffler, muddy water or the like running off the fender is guided by the folded-back portion, and can be thereby prevented from being splashed on the exhaust port. Accordingly, muddy water or the like can be made to run off while being prevented from splashing in a vicinity of the exhaust port.

In addition, the folded-back portion enters into the inner side of the fender along the outer shape of the muffler. Accordingly, it is possible to attach the folded-back portion in a manner that the folded-back portion and the muffler do not interfere with each other. As a result, the attaching operation is facilitated, while the appearance of the portion where the fender is attached is improved.

Moreover, the edge portion of the folded-back portion is positioned closer to the center of the vehicle body than the innermost rim portion of the muffler. Accordingly, muddy water or the like splashed on the inner side of the fender is guided by the folded-back portion, and then runs off between the wheel and the innermost rim portion of the muffler. Accordingly, the muddy water or the like is prevented from being splashed on the muffler. This makes muddy water or the like unlikely to run on a vicinity of the exhaust port along the outer peripheral surface of the muffler.

Furthermore, when the folded-back portion is inclined downwardly, the folded-back portion is provided with a guiding function of controlling the running of muddy water or the like. Accordingly, it is possible to securely cause muddy water or the like to run down along the folded-back portion, while it is possible to make dried soil or the like unlikely to be stuck on the edge portion of the fender.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9(*b*) is a cross-sectional view taken along the line II-II of FIG. 7;

FIG. 9(*c*) is a cross-sectional view taken along the line III-III of FIG. 7;

FIG. 9(*d*) is a cross-sectional view taken along the line IV-IV of FIG. 7;

DETAILED DESCRIPTION OF THE PREFERRED EMBODIMENTS

Figure 1:
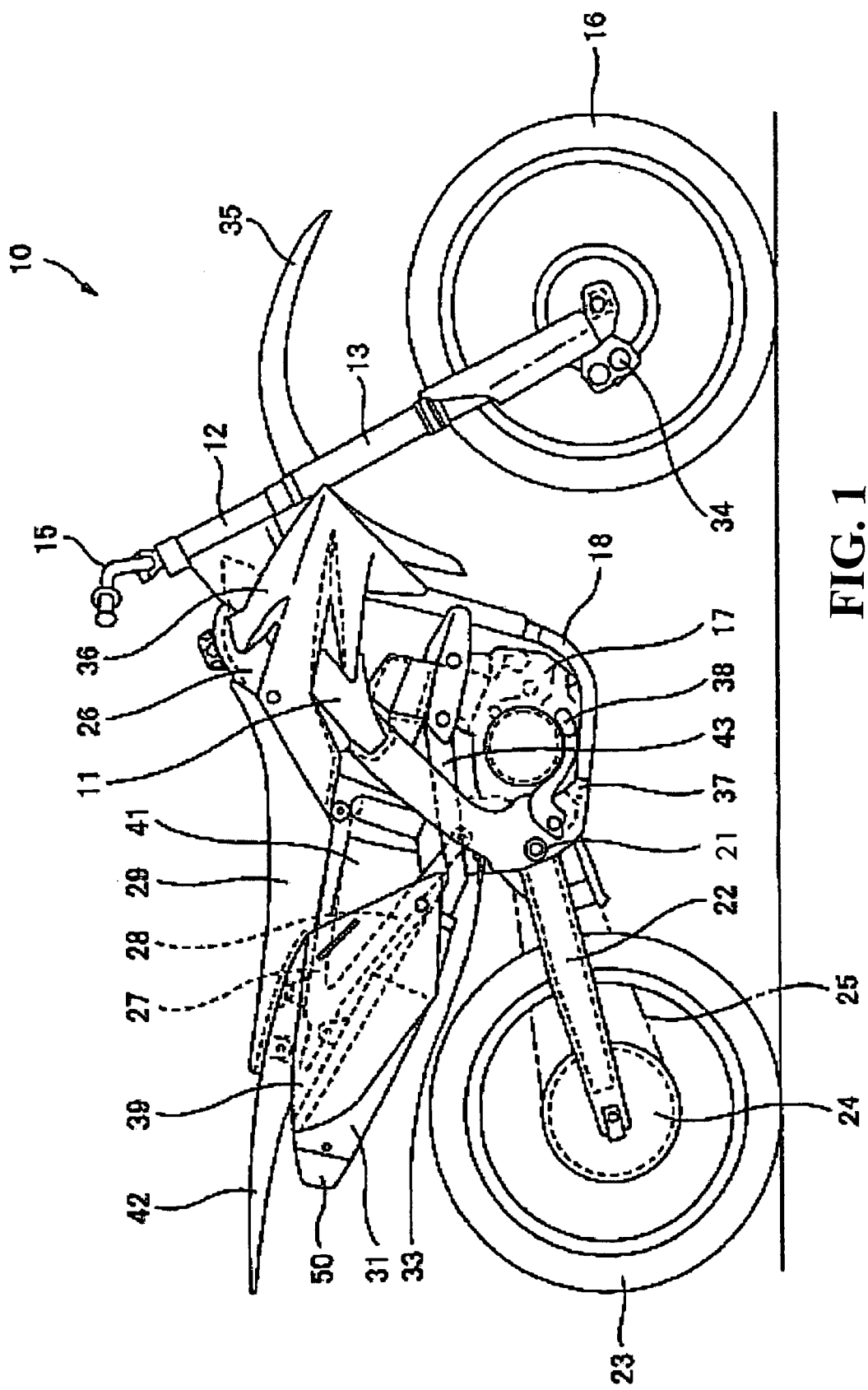
FIG. 1 is a right-side view of a motorcycle provided with a rear fender according to an embodiment of the present invention.

FIG. 1 is a side view of a motorcycle provided with a rear fender structure according to the present invention. In the following descriptions, each of the front-and-rear direction and the right-and-left direction indicates a direction viewed from a rider of the motorcycle (the direction from the left side to the right side of FIG. 1 is referred to as the front direction), while the width direction indicates the width direction of the motorcycle (the direction perpendicular to the plane of FIG. 1).

In an off-road motorcycle 10, a pair of head pipes 12 are provided to the front portion of a main frame 11, and a pair of front forks 13 are steerably attached respectively to the lower sides of the head pipes 12. A steering handle 15 is attached to the upper ends of the front forks 13, while a front wheel 16 is rotatably attached to the lower ends of the front forks 13.

A single cylinder engine 17 is suspended from the main frame 11, and is surrounded by a downtube 18 extending downwardly from the front portion of the main frame 11. The rear end of the downtube 18 is connected to the rear portion of the main frame 11. Swing arms 22 are also attached to the rear portion of the main frame 11 with a pivot 21 so as to be able to swing in the up-and-down direction. A rear wheel 23 is rotatably attached to the rear ends of the swing arms 22. A chain 25 for transmitting power of the engine 17 to the rear wheel 23 is engaged with a sprocket 24 provided to the rear wheel 23.

A fuel tank 26 is attached to the front portion of the main frame 11. A seat rail 27 is attached to the rear portion of the main frame 11, and extends from the upper side of the rear portion of the main frame 11. The seat rail 27 is reinforced with substays 28 extending obliquely. A seat 29 is mounted on the seat rail 27. In addition, mufflers 31 and 31 (one of which is positioned on the far side in FIG. 1), each extending obliquely rearwardly and upwardly along the substays 28, are disposed respectively on the two sides of the vehicle. Shock absorbers 33 for controlling the swinging movements of the swing arms 22 are disposed respectively near the ends of the mufflers 31 on the front side of the vehicle body (on the right in FIG. 1).

It should be noted that, an exhaust pipe 43 extends from the engine 17. A caliper 34 is provided for braking the front wheel. A front fender 35 is provided adjacent to a cowl 36. A step bar 37 is provided where the rider's foot is placed. A brake pedal 38 is provided. A protector 39 is provided to each muffler 31 together with a small side cover 41 and a rear fender 42.

Descriptions will be given of the disposition of the components of the rear portion of the motorcycle 10 with reference to FIG. 2 to FIG. 5.

Figure 2:
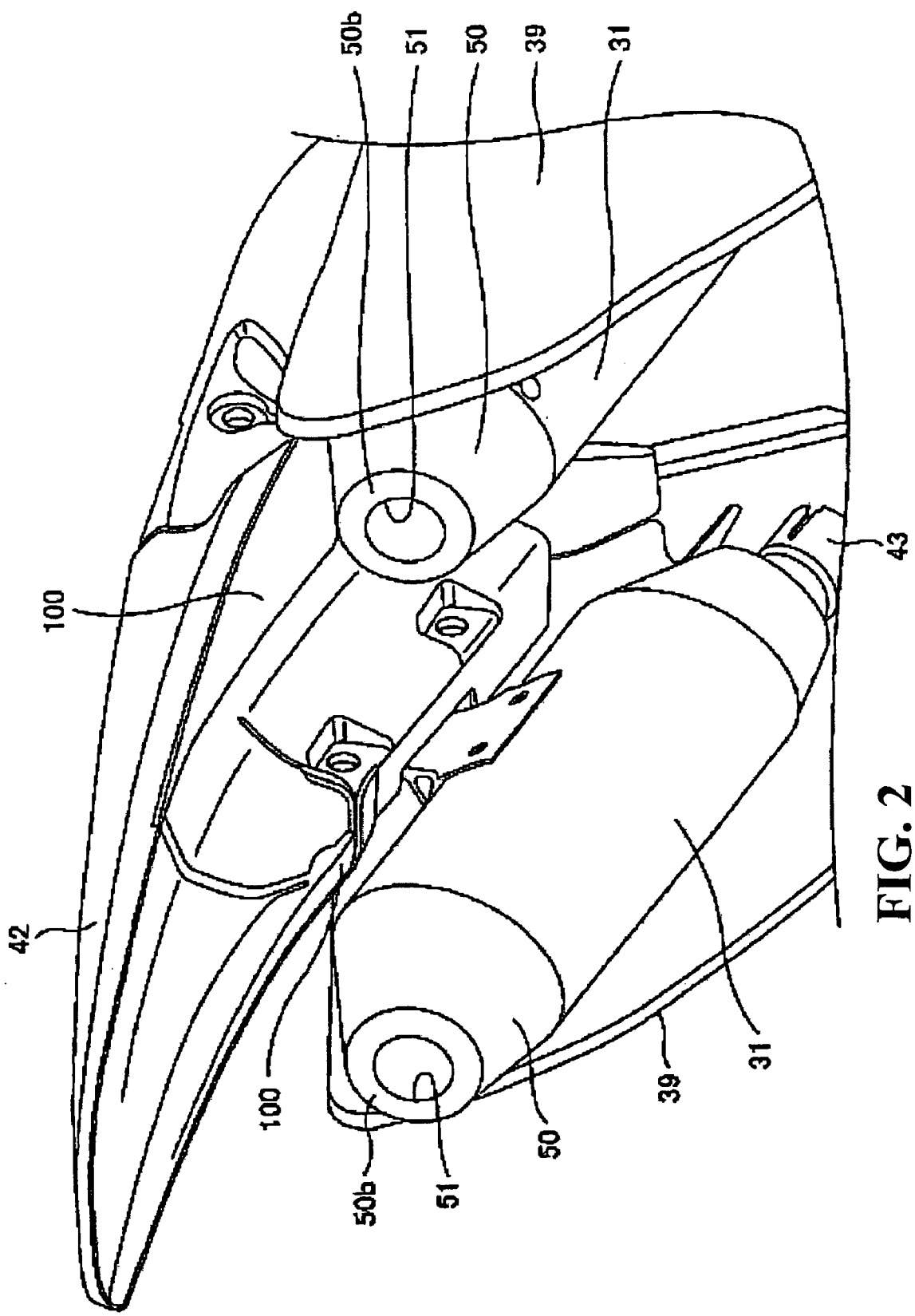
FIG. 2 is an enlarged perspective view of the rear of the motorcycle shown in FIG. 1, as seen from the lower right side.
Figure 3:
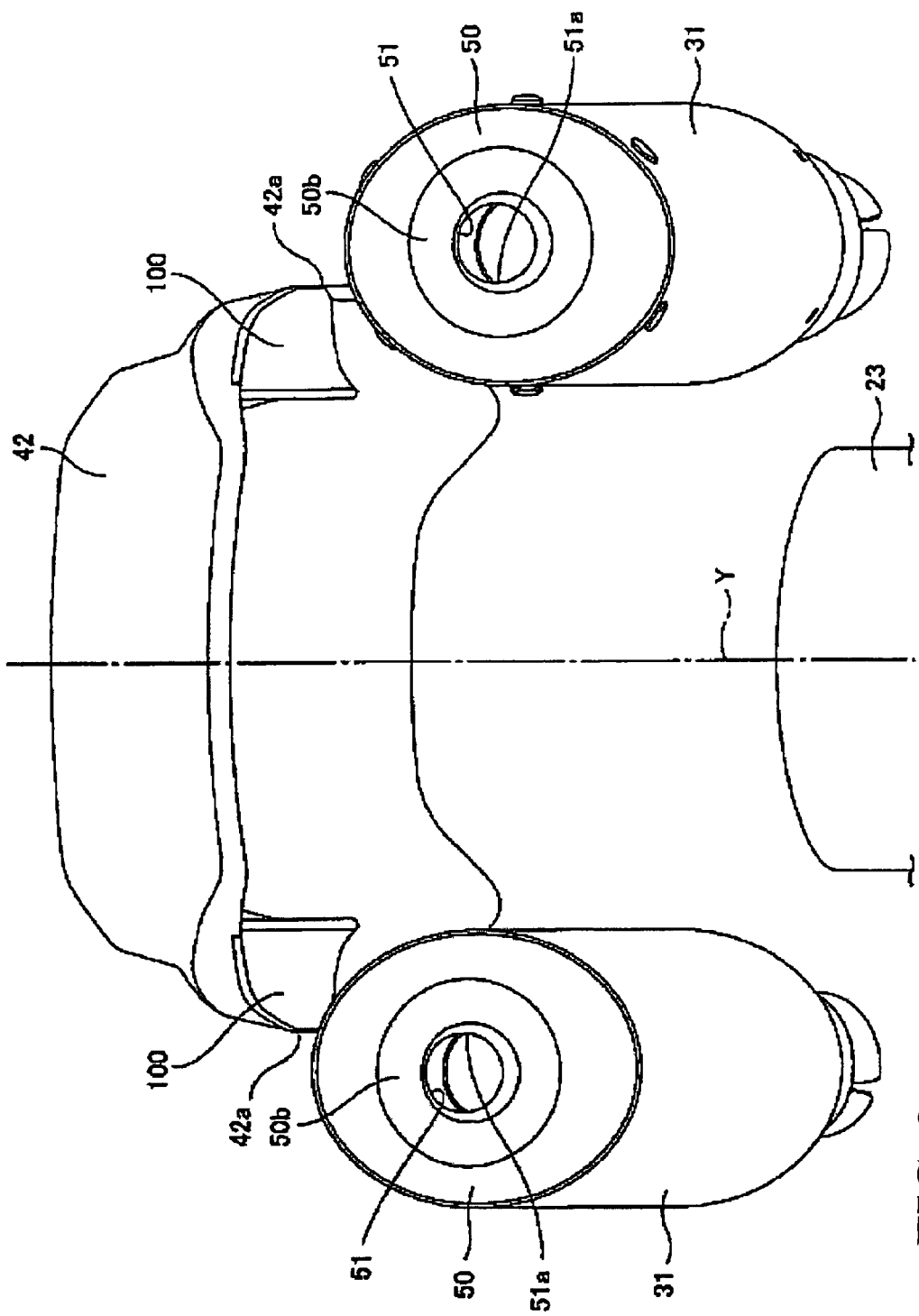
FIG. 3 is a rear (back) view of the motorcycle shown in FIG. 1, as seen from the rear side.
Figure 4:
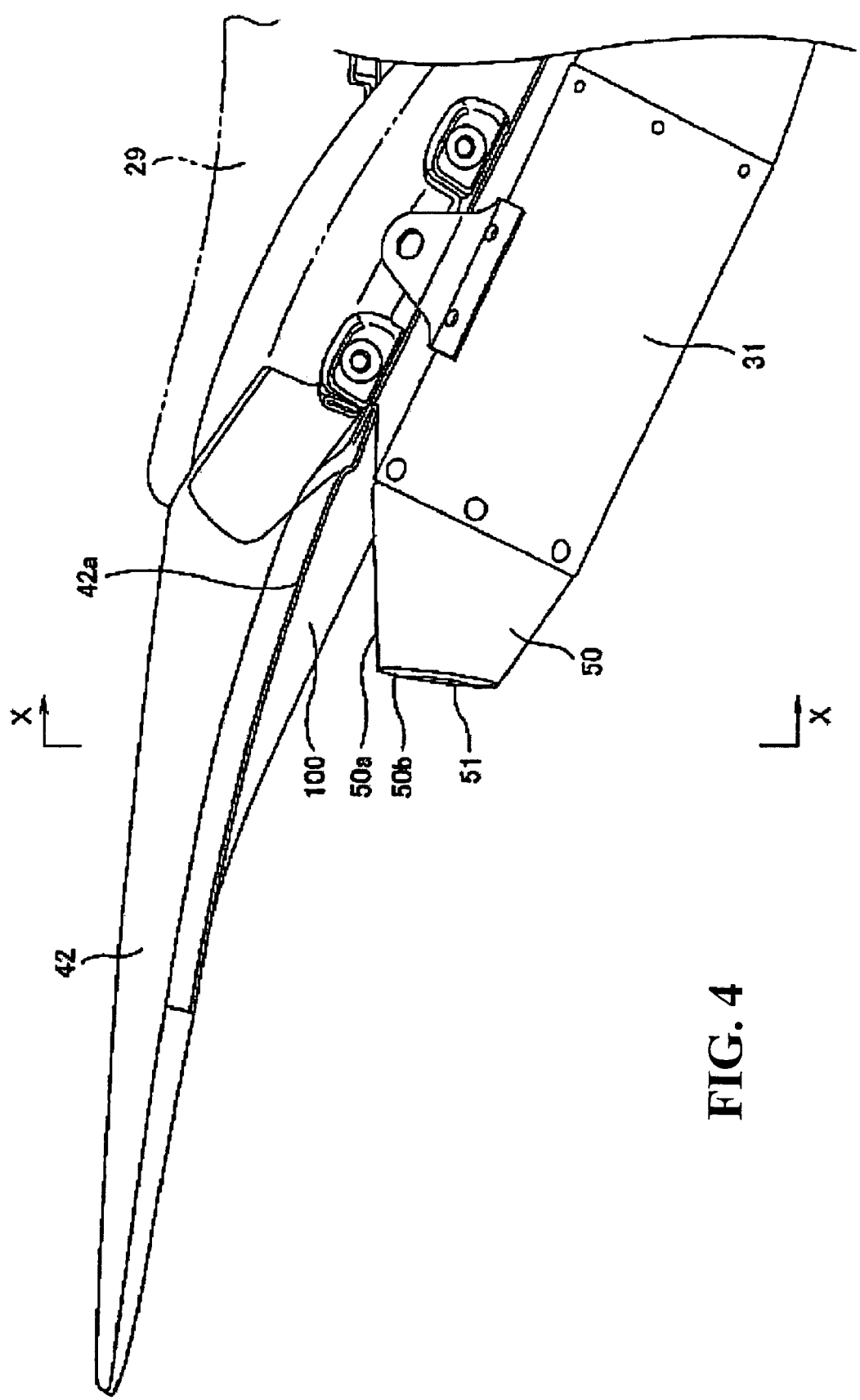
FIG. 4 is a right-side view of FIG. 3, as seen from the right side.
Figure 5:
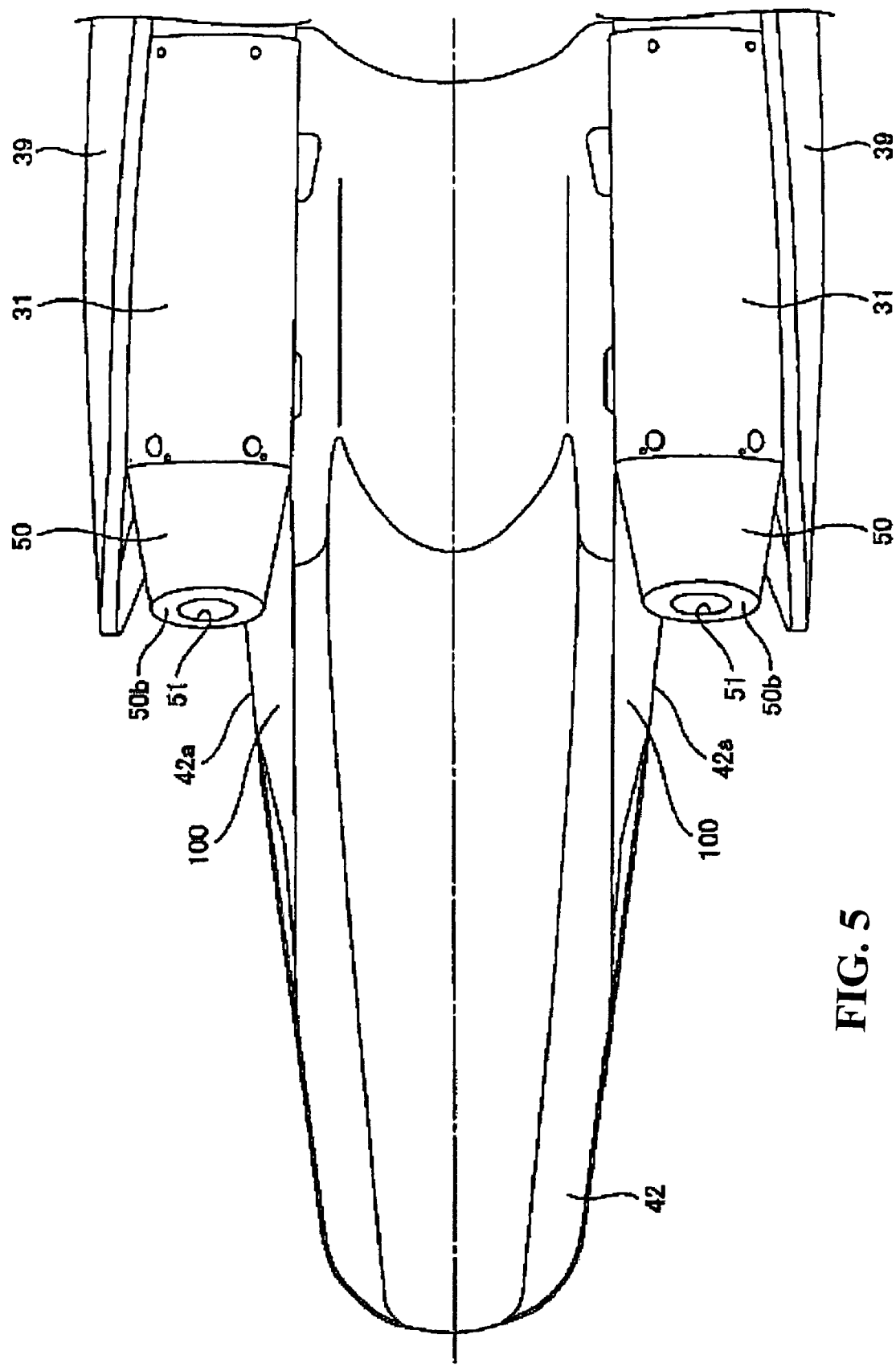
FIG. 5 is a bottom view of FIG. 3, as seen from the lower side.

As shown in FIG. 3, the mufflers 31 are disposed respectively on the two side of the upper portion of the rear wheel 23. Each muffler 31 is provided with the end cap 50 on the rear end portion of the muffler 31 as shown in FIG. 2 to FIG. 5. The shape of each end cap 50 is tapered towards the tip thereof (towards the rear portion of the vehicle body) in a manner that the contour 50*a* of the upper portion of the end cap 50 is not horizontal, but sloped obliquely downwardly and rearwardly as shown in FIG. 4. In addition, in the present embodiment, the mufflers 31 are disposed on the two sides, but the muffler 31 may be disposed on any one of the two sides (one side).

In addition, an exhaust port 51 is formed in the center portion of the rear end face 50*b* of each end cap 50. The exhaust ports 51 are configured to discharge, to the outside, an exhaust gas sent from the engine 17 through the exhaust pipe 43.

On the other hand, as shown in FIG. 3, a rear fender 42 is disposed above the rear wheel 23 in a manner that the rear fender 42 covers the upper portion of the rear wheel 23 in the width direction of the rear wheel 23. The mufflers 31 and the end caps 50 for the mufflers 31 are disposed respectively below edge portions 42*a* (described later in detail) of the rear fender 42, which are the two end portions of the rear fender 42 in the width direction thereof. More specifically, the edge portions 42a of the rear fender 42 are positioned vertically above the inner side end portion 51a of the inner peripheral surface (the portion closest to the center line Y of the vehicle body) of the exhaust port 51.

In addition, the rear fender 42 extends, as shown in FIG. 1 and FIG. 4, over the rear wheel 23 in the front-and-rear direction of the vehicle body. The front-side portion of the rear fender 42 extends obliquely upwardly and rearward substantially along the longitudinal direction of the mufflers 31 from the front-side portions of the mufflers 31, is then is flexed slightly downwardly near and above the end caps 50, and further extends obliquely upwardly and rearwardly. Moreover, each end cap 50 has a shape tapered towards the rear end portion thereof in the side view.

Figure 6:
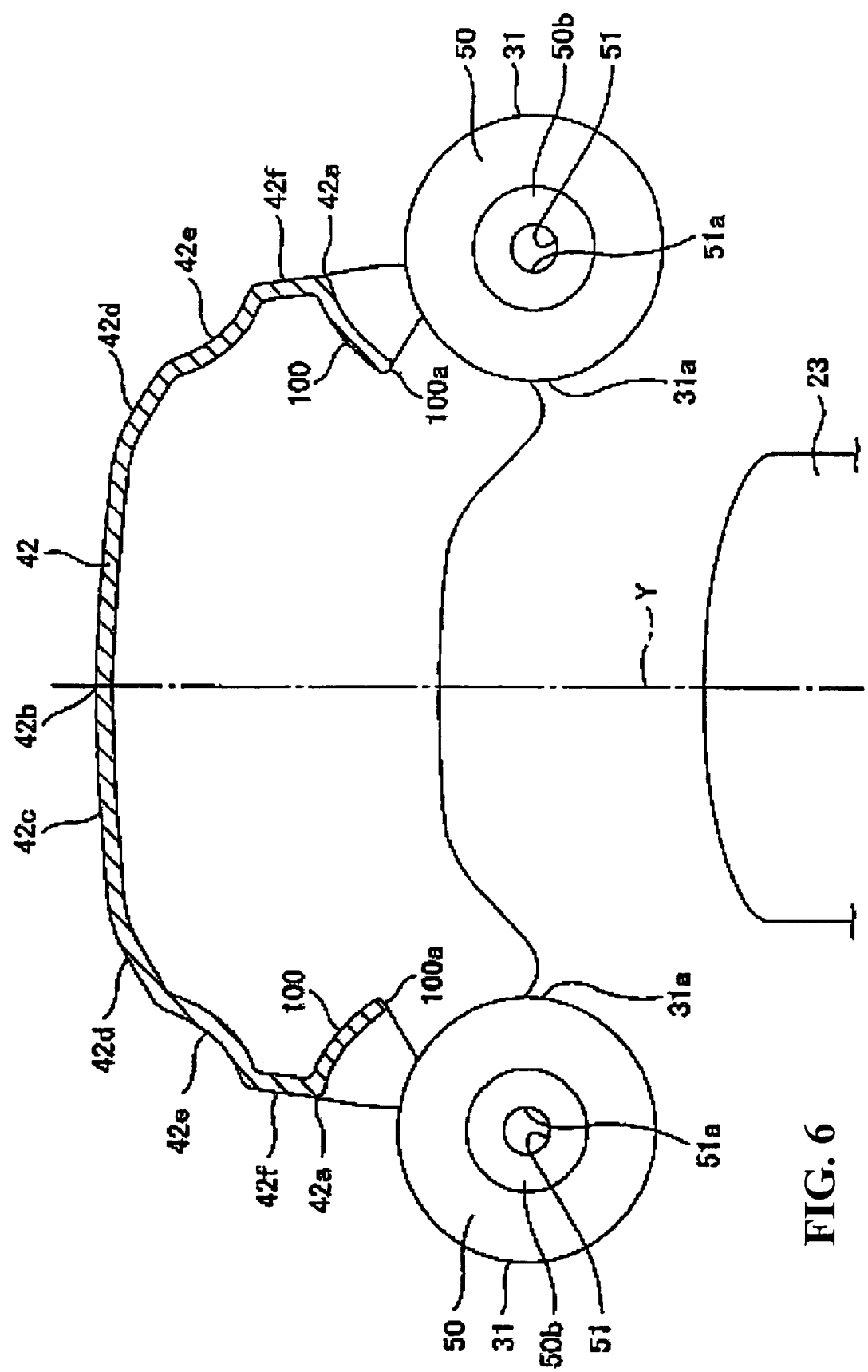
FIG. 6 is a cross-sectional view, taken along the vertical direction, of the rear portion of the motorcycle shown in FIG. 1.

FIG. 6 is a cross-sectional view taken along the line X-X in FIG. 4 as viewed in the same direction as in the case of FIG. 2. The cross-sectional shape of the rear fender 42 is, as shown in FIG. 6, an inverted U-shape in which the lower portion is opened, and the two edge portions of the cross-sectional shape extend downwardly. A guide member 100 (a folded-back portion) is provided to each edge portion 42a of the rear fender 42. The guide member 100 is folded back towards the center line Y (towards a region on the inner side of the corresponding muffler 31), and is also inclined downwardly. More specifically, the rear fender 42 includes a top portion 42b in a portion where the rear fender 42 intersects the center line Y of the rear wheel 23. The rear fender 42 further includes first inclined portions 42c, second inclined portions 42d, third inclined portions 42e and fourth inclined portions 42f. Each of the first inclined portions 42c is gently inclined outwardly and downwardly from the top portion 42b. Each of the second inclined portions 42d is further inclined outwardly and downwardly from the end position of the corresponding first inclined portion 42c (at an angle of approximately 30 degrees). Each of the third inclined portions 42e is further inclined outwardly and downwardly from the end position of the corresponding second inclined portion 42d (at an angle of approximately 45 degrees), forming a concave shape. Each of the fourth inclined portions 42f is steeply inclined outwardly and downwardly from the end position of the corresponding third inclined portions 42e. Then, the end positions of the fourth inclined portions 42f are formed respectively into the edge portions 42a of the rear fender 42.

In addition, each of the guide members 100 is, as shown in FIG. 6, formed integrally with the rear fender 42. Concurrently, each of the guide members 100 has a shape entering, in the width direction, into the inside of the vehicle body toward the center line Y substantially along the outer shape of the corresponding muffler 31 from the corresponding edge portion 42a of the rear fender 42. Moreover, each of the guide members 100 is formed into a shape continuously sloping down (inclined downwardly) towards the inner side of the vehicle body.

Figure 7:
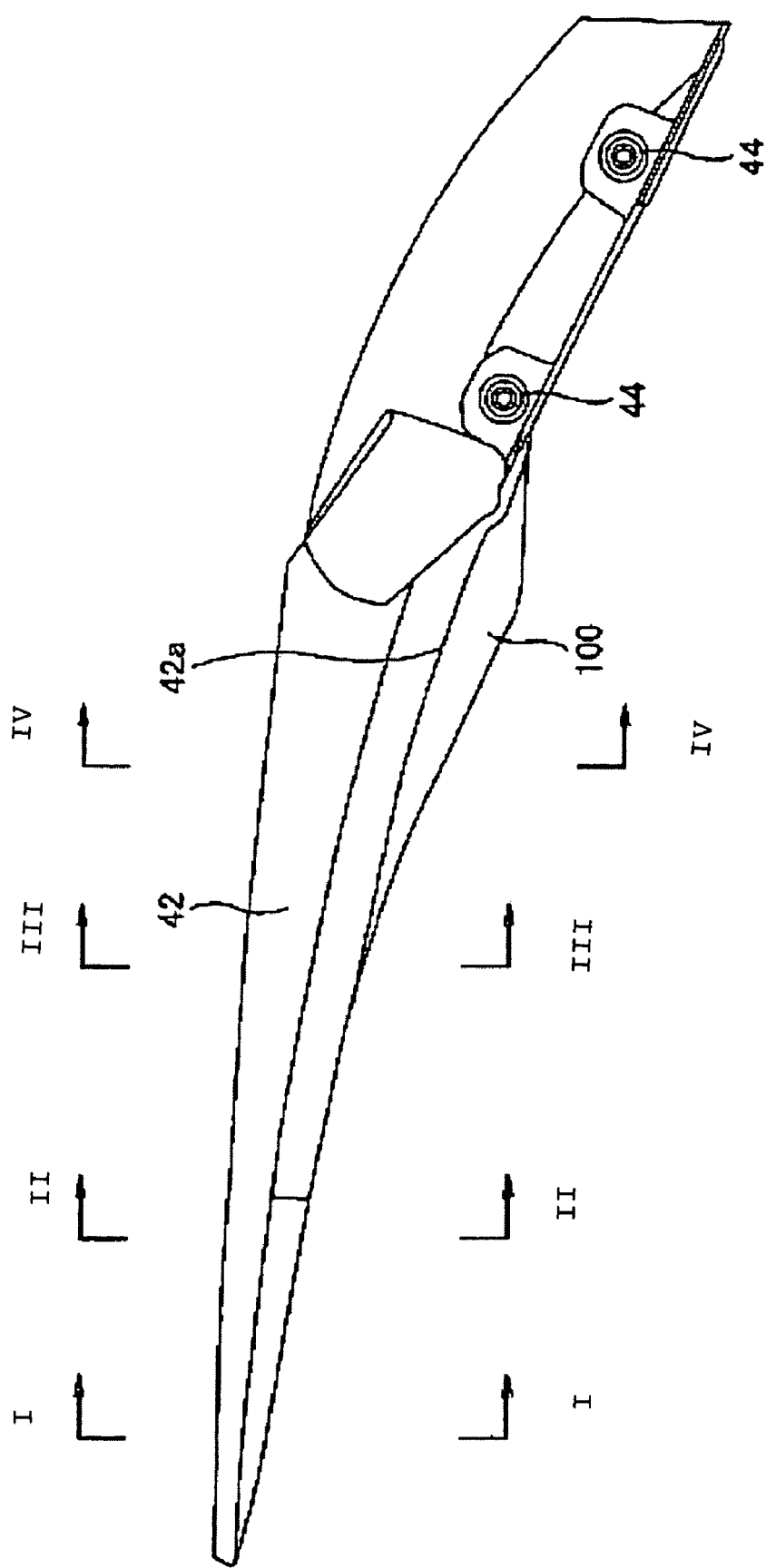
FIG. 7 is a right-side view of the rear fender according to the embodiment of the present invention, as shown alone.
Figure 8:
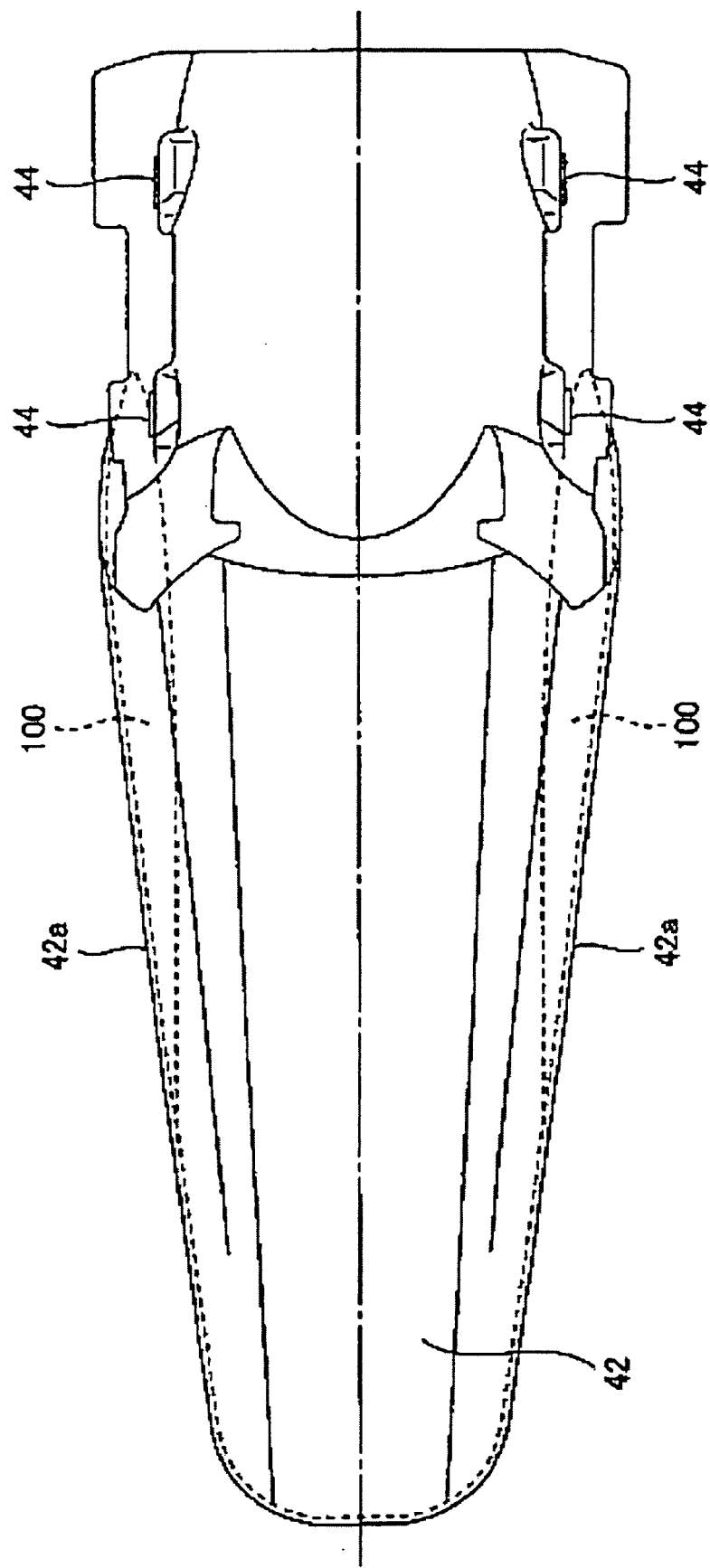
FIG. 8 is a plan view of FIG. 7, as seen from above.

Descriptions will be given of the shape of each of the guide members 100 in the front-and-rear direction of the vehicle body with reference to FIG. 7 and FIG. 8. FIG. 7 is a right-side view showing the rear fender 42 alone. FIG. 8 is a plan view of the rear fender 42 shown in FIG. 7, as viewed from above. In addition, FIG. 9(a) to FIG. 9(d) are cross-sectional views of the rear fender 42 shown in FIG. 7, as being cut along the line I-I to the line IV-IV, and respectively show the corresponding portions. In addition, the cross-section (FIG. 9(d)) taken along the line IV-IV of FIG. 7 corresponds to the cross-section of the rear fender 42 shown in the cross-section (FIG. 6) taken along the line X-X of FIG. 4.

Figure 9A:
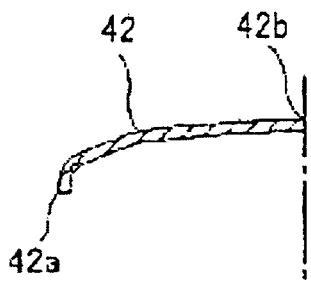
FIG. 9(*a*) is a cross-sectional view taken along the line I-I of FIG. 7.
Figure 9B:
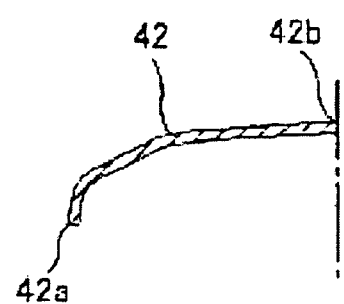
Figure 9C:
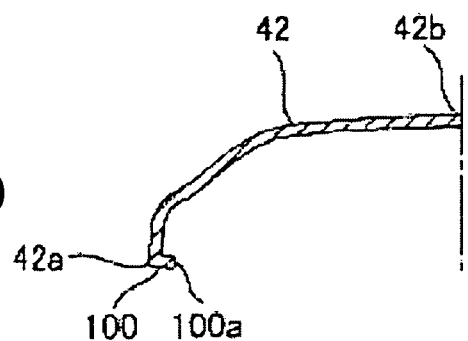
Figure 9D:
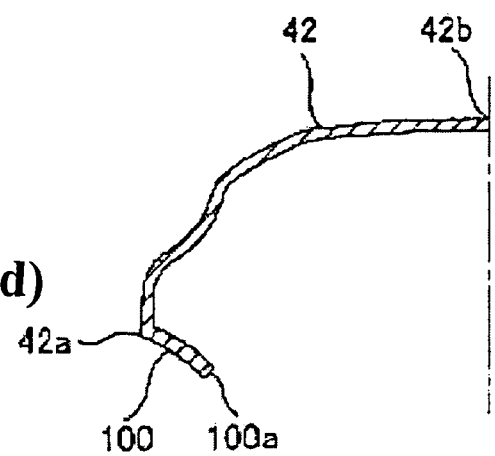

The guide members 100 are, as shown in FIG. 7, not provided to the rear end portion of the rear fender 42, but are provided respectively to portions in vicinities of the end caps 50 and the exhaust ports 51 of the end caps 50. That is, the guide members 100 are provided to substantially the center portion of the rear fender 42 in the front-and-rear direction (see FIG. 4). More specifically, the guide members 100 are not provided to the cross-sectional portions shown in FIG. 9(a), which is the cross-section taken along the line I-I of FIG. 7, and to the cross-sectional portions shown in FIG. 9(b), which is the cross-section taken along the line II-II of FIG. 7. The shape of the guide members 100 start to gradually project towards the inside of the vehicle body, at the cross-sectional portion shown in FIG. 9(c), which is the cross-section taken along the line III-III of FIG. 7. The shape of the guide members 100 start to gradually project from a portion in the vehicle body slightly more rearwardly than the exhaust ports 51. The guide members 100 project at the cross-sectional portion shown in FIG. 9(d), which is the cross-section taken along the line IV-IV of FIG. 7, that is, at a portion near the end caps 50, in a manner that an end portion 100a of each of the guide members 100 (an end portion of each of the folded-back portions) is positioned between the corresponding exhaust port 51 and the rear wheel 23 (see FIG. 6). As can be seen in FIGS. 3, 6, and 9(d), guide members 100 have concave surfaces which face the convex surfaces of the mufflers 31 and extend rearwardly over upper portions of the end cap 50 of the mufflers 31. Further, as can be seen in FIGS. 6 and 9(d), a cross-section of each of the guide members 100 taken immediately rearward of the ends caps 50 is arc-shaped. Moreover, the guide members 100 preferably extend in a manner that each end portion 100a is positioned between an innermost rim portion 31a of the corresponding muffler 31 (see FIG. 6) and the rear wheel 23 (closer to the center of the vehicle body than the innermost rim portion 31a of the corresponding muffler 31).

In addition, in FIGS. 7 and 8, an attachment portion 44 (two portions) is provided where the rear fender 42 is attached to the vehicle body.

Next, descriptions will be given of the operations of the fender structure for a motorcycle according to the embodiment of the present invention with reference to FIG. 6.

Muddy water or the like splashed by the rear wheel 23 while the motorcycle 10 is traveling is first received on the upper portion of the inner side of the inverted U-shape of the rear fender 42 shown in FIG. 6, that is, the muddy water is received on the inner-side faces of the first inclined portions 42c. Accordingly, the muddy water or the like is prevented from being splashed above the rear fender 42. The muddy water or the like indicates, for example, soil or granular soil mixed with water to be softened. However, in the present specification, the muddy water or the like is a concept also including other fluids composed of substances other than soil.

The muddy water or the like having reached the first inclined portions 42c runs down sequentially along the inner surfaces of the second inclined portions 42d, of the third inclined portions 42e, and of the fourth inclined portions 42f, by its own weight. Accordingly, the muddy water or the like reaches the edge portions 42a.

Then, the muddy water or the like runs down along the guide members 100. More specifically, each of the guide members 100 extends to a position between the corresponding exhaust port 51 and the rear wheel 23 at least in a position near the corresponding end cap 50 in the front-and-rear direction of the vehicle body, that is, in the position near the exhaust ports 51, as shown in FIG. 6. For this reason, the muddy water or the like having reached the edge portions 42a is guided to the end portions 100a along the guide members 100, and then runs through between the exhaust ports 51 and the rear wheel 23, running off vertically downwardly. At this time, even if the muddy water or the like having run off from the end portions 100a is splashed on the end caps 50, the muddy water or the like is splashed only on a part of the end caps 50 on the inner side of the vehicle body, inward of the exhaust ports 51. Accordingly, the muddy water or the like runs off downwardly along the shape of the inner side portion of each end cap 50 without entering into the inside of the exhaust ports 51.

In the fender structure for a motorcycle according to the embodiment of the present invention, the rear fender 42 is provided with the guide members 100 extending obliquely downwardly respectively from the edge portions 42a of the rear fender 42 towards the rear wheel 23. In addition, each of the end portions 100a of the guide members 100 is positioned between the corresponding exhaust port 51 and the rear wheel 23. Accordingly, muddy water or the like splashed by the rear wheel 23 during the traveling of the motorcycle 10 is caused to run through between each of the exhaust port 51 and the rear wheel 23, then to drop off downwardly. Thereby, it is possible to prevent the muddy water or the like from running in a vicinity of the exhaust ports 51, thus preventing dried soil or the like from being stuck on a part of the exhaust ports 51. In addition, the work for removing soil having adhered on vicinities of the exhaust ports 51 at the time of maintenance is eliminated. Moreover, there is no need for providing such a large rear fender 42 as to also cover the upper portions of the mufflers 31 for the purpose of preventing muddy water or the like from being splashed on the mufflers 31. Thus, the material costs can be reduced while the rear fender 42 can be formed into a shape with a compact appearance.

Moreover, each of the guide members 100 has a shape entering, in the width direction of the wheel, the inside of the rear fender 42 along the outer shape of the corresponding muffler 31. Accordingly, it is possible to attach the guide members 100 in a manner that the guide members 100 do not interfere with the mufflers 31. In addition, it is possible to prevent the appearance of the part where the rear fender 42 is attached from being deteriorated.

Furthermore, each of the guide members 100 is formed to be inclined downwardly and towards the inner side of the vehicle body from the corresponding edge portion 42a of the rear fender 42. Thereby, it is possible to securely cause muddy water or the like to run downwardly, and concurrently it is possible to prevent dried mud or the like from being stuck on the edge portions 42a of the rear fender 42. Accordingly, it is possible to ease the work for removing the mud from the rear fender 42.

The best mode for carrying out the present invention has been described above. However, the present invention is not limited to the above-described embodiment, and various modifications and changes can be made thereon on the basis of the technical concept of the present invention.

Figure 10:
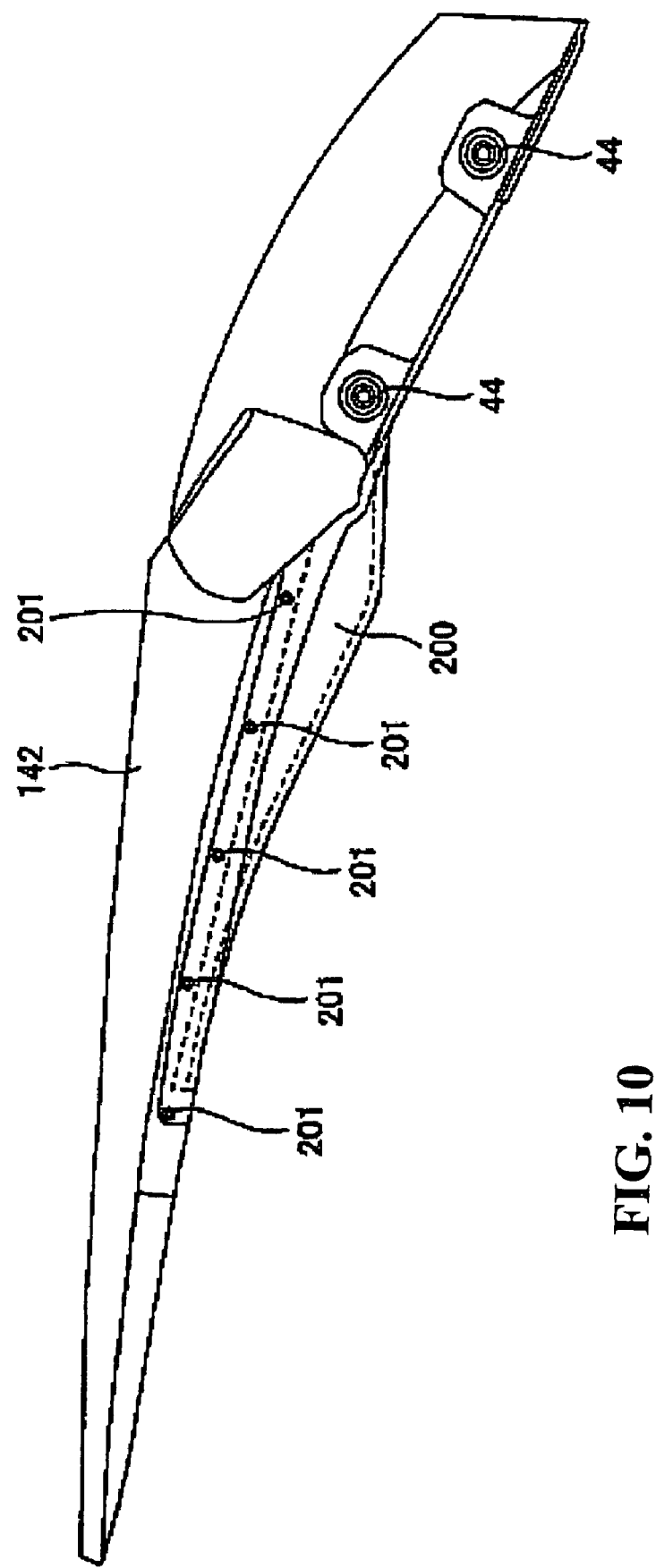
FIG. 10 is a right-side view of a rear fender according to another embodiment of the present invention, as shown alone.
Figure 11:
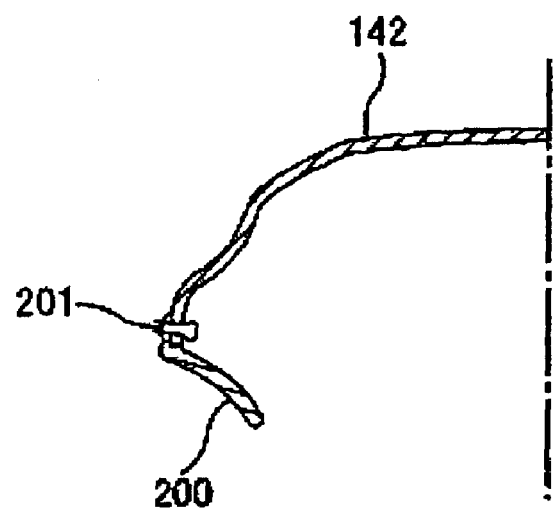
FIG. 11 is a cross-sectional view taken along a portion of FIG. 10.

In the embodiment, the guide members 100 are formed integrally with the rear fender 42. However, as shown in FIG. 10 and 11, it is possible to form a rear fender 142 and guide members 200 separately, and then to fasten the rear fender 142 and the guide members 200 with fastening members 201 such as screws. Since each of the guide members 100 has a shape projecting to the inside of the rear fender 42, a large molding die with a complicated shape is required in a case where the guide members 100 are formed integrally with the rear fender 42. However, the configuration, in which the rear fender 142 and the guide members 200 are separately formed, makes it possible to reduce the size of the molding die, and also to simplify the shape thereof.

In addition, in the embodiment, each of the guide members 100 is provided mainly to a portion near the corresponding end cap 50. However, it is also possible to provide the guide members 100 along the entire lengths of the mufflers 31. This makes it possible to prevent muddy water or the like from being splashed on the entirety of each muffler 31.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fender structure for a motorcycle provided with a rear fender covering an upper portion of a wheel and extending downwardly on a right and left side, and a muffler positioned below at least one of a right and left edge portion of the rear fender, the fender structure comprising:
a folded-back portion extending forwardly from a position rearwardly of a rear-most end of the muffler towards a region on an inner side of the muffler from a corresponding edge portion of the rear fender,
wherein the folded-back portion is provided at a middle portion of the rear fender in a longitudinal direction and does not extend to a rear end portion of the rear fender, and
wherein the folded-back portion has a concave surface which faces the convex surface of the muffler and extends rearwardly over an upper portion of the end cap of the muffler.

2. The fender structure for a motorcycle according to claim 1, wherein the folded-back portion extends forwardly from the position rearwardly of the rear-most end of the muffler towards the region on the inner side of the muffler, inwardly of an exhaust port of the muffler.

3. The fender structure for a motorcycle according to claim 1, wherein the folded-back portion enters into the inner side of the fender along an outer shape of the muffler, and a cross-section of the folded-back portion taken immediately rearward of the end cap of the muffler is arc-shaped.

4. The fender structure for a motorcycle according to claim 2, wherein the folded-back portion enters into the inner side of the fender along an outer shape of the muffler.

5. The fender structure for a motorcycle according to claim 1, wherein the edge portion of the folded-back portion is positioned closer to a center of the vehicle body than an innermost rim portion of the muffler.

6. The fender structure for a motorcycle according to claim 2, wherein the edge portion of the folded-back portion is positioned closer to a center of the vehicle body than an innermost rim portion of the muffler.

7. The fender structure for a motorcycle according to claim 3, wherein the edge portion of the folded-back portion is positioned closer to a center of the vehicle body than an innermost rim portion of the muffler.

8. The fender structure for a motorcycle according to claim 4, wherein the edge portion of the folded-back portion is positioned closer to a center of the vehicle body than an innermost rim portion of the muffler.

9. The fender structure for a motorcycle according to claim 1, wherein the folded-back portion overlaps an entire length of an end cap of the muffler when viewed in side view.

10. The fender structure for a motorcycle according to claim 1, wherein an entirety of the folded-back portion is disposed above a lower-most portion of the muffler.

11. A fender structure for a motorcycle for a motorcycle provided with a rear fender covering an upper portion of a wheel and extending downwardly on a right and left side, and a muffler positioned below at least one of a right and left edge portion of the fender, the rear fender structure comprising:
   a folded-back portion extending forwardly from a position rearwardly of a rear-most end of the muffler towards a region on an inner side of the muffler from a corresponding edge portion of the rear fender,
   wherein the folded-back portion extending forwardly towards the region on the inner side of the muffler is inclined downwardly along the rear-most port of the muffler,
   wherein the folded-back portion is provided at a middle portion of the rear fender in a longitudinal direction and does not extend to a rear end portion of the rear fender, and
   wherein the folded-back portion has a concave surface which faces the convex surface of the muffler and extends rearwardly over an upper portion of the end cap of the muffler.

12. The fender structure for a motorcycle according to claim 11, wherein the folded-back portion overlaps an entire length of an end cap of the muffler when viewed in side view, and a cross-section of the folded-back portion taken immediately rearward of the end cap of the muffler is arc-shaped.

13. The fender structure for a motorcycle according to claim 11, wherein an entirety of the folded-back portion is disposed above a lower-most portion of the muffler.

14. A fender structure adapted for use with a motorcycle comprising:
   a rear fender covering an upper portion of a wheel and extending downwardly on a right and left side for defining a right and left edge portion of the rear fender;
   a muffler positioned below at least one of the right and left edge portions of the fender; and
   a folded-back portion extending forwardly from a position rearwardly of a rear-most end of the muffler towards a region on an inner side of the muffler from a corresponding edge portion of the rear fender,
   wherein the folded-back portion is provided at a middle portion of the rear fender in a longitudinal direction and does not extend to a rear end portion of the rear fender, and
   wherein the folded-back portion has a concave surface which faces the convex surface of the muffler and extends rearwardly over an upper portion of the end cap of the muffler.

15. The fender structure for a motorcycle according to claim 14, wherein the folded-back portion overlaps an entire length of an end cap of the muffler when viewed in side view.

16. The fender structure for a motorcycle according to claim 14, wherein an entirety of the folded-back portion is disposed above a lower-most portion of the muffler.

17. The fender structure for a motorcycle according to claim 14, wherein the folded-back portion extending forwardly from the position rearwardly of the rear-most end of the muffler towards a region on an inner side of the muffler the folded-back portion is inclined downwardly.

18. The fender structure adapted for use with a motorcycle according to claim 14, wherein the folded-back portion extends forwardly from the position rearwardly of the rear-most end of the muffler towards the region on the inner side of the muffler, inwardly of an exhaust port of the muffler.

19. The fender structure adapted for use with a motorcycle according to claim 14, wherein the folded-back portion enters into the inner side of the fender along an outer shape of the muffler, and a cross-section of the folded-back portion taken immediately rearward of the end cap of the muffler is arc-shaped.

20. The fender structure adapted for use with a motorcycle according to claim 14, wherein the edge portion of the folded-back portion is positioned closer to a center of the vehicle body than an innermost rim portion of the muffler.

* * * * *